United States Patent [19]

Coueille

[11] 4,137,375

[45] Jan. 30, 1979

[54] BUTTON TYPE ELECTRIC CELLS

[75] Inventor: Daniel Coueille, Poitiers, France

[73] Assignee: Saft-Societe des Accumulateurs Fixes et de Traction, Romainville, France

[21] Appl. No.: 869,487

[22] Filed: Jan. 16, 1978

[30] Foreign Application Priority Data

Jan. 21, 1977 [FR] France .................. 77 01705

[51] Int. Cl.² ........................... H01M 6/00
[52] U.S. Cl. ........................ 429/66; 429/162
[58] Field of Search ............ 429/66, 162, 218, 220, 429/228

[56] References Cited

U.S. PATENT DOCUMENTS

| | | | |
|---|---|---|---|
| 3,438,812 | 4/1969 | Cherney et al. ............ | 429/162 X |
| 3,839,092 | 10/1974 | Hausler et al. ............ | 429/162 X |
| 4,018,970 | 4/1977 | Jumel et al. ............... | 429/162 |
| 4,020,242 | 4/1977 | Okazaki et al. ............ | 429/66 |
| 4,054,726 | 10/1977 | Sauer et al. ............... | 429/66 |

*Primary Examiner*—Anthony Skapars
*Attorney, Agent, or Firm*—Kenyon and Kenyon, Reilly, Carr & Chapin

[57] ABSTRACT

The invention relates to button type electric cells, i.e., cells comprising two cups containing, respectively, positive and negative active materials, fitted into each other and insulated from each other by a seal. The positive cup contains at least one compartment situated between it and the positive material and delimited on the positive material side by a perforated sheet; the compartment is filled with electrolyte when the active materials are in the state where they take up the greatest volume. Particularly applicable to lithium cells whose positive material is cupric oxide, lead oxide or red lead.

6 Claims, 3 Drawing Figures

BUTTON TYPE ELECTRIC CELLS

BACKGROUND OF THE INVENTION

1. Field of the Invention

The present invention relates to button type electric cells and, more particularly, to cells in which the chemical transformations undergone by the electrochemically active materials cause a change in their overall volume between the charged state and the discharged state. The term, electrochemically active materials, is used herein to mean both positive and negative active materials together with the electrolyte, provided that at least one of the components of the electrolyte takes part in the charge and discharge reactions.

2. Description of the Prior Art

The majority of button type cells consist of a first metal cup containing the positive active mass and acting as the collector of the positive electrode, a second metal cup containing the negative active mass and acting as the collector of the negative electrode, an electrolyte impregnated separator between the positive and negative active materials and an insulating seal between the two cups, one of which is fitted into the other. The seal simultaneously seals the assembly and electrically insulates the cup from each other.

In such cells, if the volume of the active materials changes between the charged state and the discharged state, it can follow according to the circumstances either that the button swells or, on the contrary, that a void is created inside the button. In order to avoid the first case, the cell may be provided with a casing whose size corresponds to the state where the active materials take up their maximum volume, but in all cases, when passing from the maximum volume state to the minimum volume state, the void which is generated inside gives rise to some disadvantages.

In the case of primary cells, the problem occurs particularly with those cells which have a soluble negative electrode and in which the reaction products of the negative electrode during discharge migrate to the positive compartment while the negative compartment is progressively emptied, beginning with the region next to the separator. If the migration of the discharge products to the positive compartment does not cause corresponding swelling of the positive active material, breaking of the ionic contact between the two electrodes can result, since the intervening gap has increased. This broken contact thus cause the discharge to stop prematurely.

SUMMARY OF THE INVENTION

The present invention remedies the above-described disadvantage.

It provides in a button type electric cell comprising a first metal cup containing the positive active mass and acting as a current collector for the positive electrode, a second metal cup containing the negative active mass and acting as a current collector for the negative electrode, a separator impregnated with electrolyte between the positive and negative active masses and an insulating seal between the two cups fitted into each other, where the overall volume of the active masses is different in the charged state than in the discharged state, the improvement wherein the first cup also contains at least one compartment situated between said first cup and the positive active mass and delimited adjacent this mass by a perforated sheet, said compartment being filled with electrolyte when the active materials of the cell are in that state of charge in which they take up the maximum volume.

By this arrangement, the electrolyte contained in said compartment will be attracted by capillary action into the voids generated in the electrodes by the reduction in overall volume of the active materials during conversion to the state of charge in which the active materials occupy minimum volume. In this way, the electrochemical reaction can continue until the transformation of the active materials is complete, provided that the extra volume of electrolyte in the cell is adequate.

BRIEF DESCRIPTION OF THE DRAWINGS

Embodiments of the invention are described by way of example with reference to the accompanying drawing in which.

DESCRIPTION OF THE PREFERRED EMBODIMENTS

Figure 1:
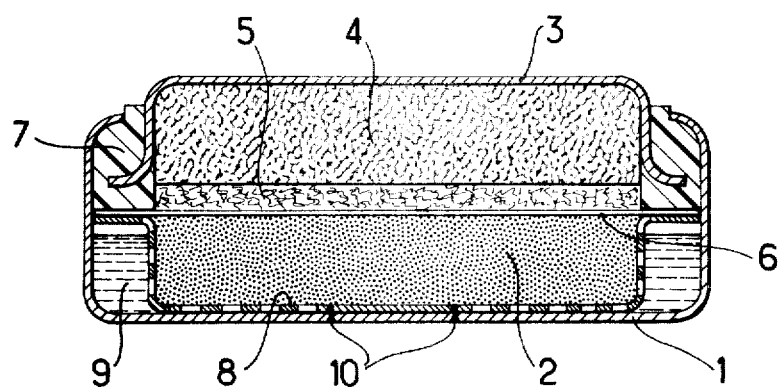
FIG. 1 shows schematically a cross-section of a cell in accordance with the invention.

In FIG. 1, a button type electric cell comprises a casing formed by cups 1 and 3, the edges of the cup 1 being turned down over the edges of the cup 3, with a plastic seal 7 interposed between them. The two cups are made of nickel-plated steel (or stainless steel) and the seal 7 is made of polypropylene.

A positive active mass 2 is contained in cup 1 and is a mixture of positive active material and of an electron conductor. The positive active material is chosen from among cupric oxide, lead oxide (PbO), or red lead ($Pb_3O_4$); the electron conductor can be graphite or a metal. Preferably, it is a metal which reduces or cancels the initial discharge voltage peak of the cell (such as zinc, lead or tin), as described in French patent No. 74 34 867, published under No. 2,288,401 and corresponding to U.S. Pat. No. 4,018,970.

A negative active mass 4 is contained in the cup 3 and is preferably lithium. A separator interposed between the masses 2 and 4 is composed of two layers, a layer 5 made of hydrophilic cellulose felt and a layer 6 made of a sheet forming a barrier against particles of the active mass.

In accordance with this embodiment of the present invention, the positive active mass 2 is confined within a perforated cup 8 made of nickel-plated steel (or stainless steel), the bottom of which is in close contact with the bottom of cup 1, to which it can be welded, as at 10, to improve the conductivity between cup 8 and cup 1. Cup 8 provides an annular space 9 surrounding the positive mass which is filled with electrolyte when the cell is in the fresh (i.e., charged) state. During discharge of the cell, the negative active mass 4 decreases in volume, since the lithium passes into solution and migrates to the positive compartment, where it is accommodated in the form of lithium oxide ($Li_2O$) in the pores of the positive mass 2.

As discharge progresses, the electrolyte carried by separator 5 no longer fills the middle compartment, the volume of which has increased. However, the electrolyte initially contained in the annular compartment 9 then passes through the empty capillary spaces, first of the positive mass, then of the separator 5; so that discharge can take place without any increase in the internal resistance of the cell.

The interior volume of compartment 9 is chosen to be of the order of the variation of the overall volume of the active materials in the cell, or about 0.3cm$^3$ per ampere-hour. It is simple to compute the variation of the overall volume of the active materials by considering the discharge reaction of, for example, a lithium cupric-oxide cell. The weights (in g) and the volumes (in cm$^3$) per ampere-hour of these materials are given below:

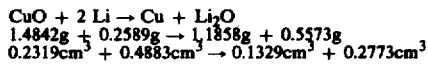

Thus,
$$0.7202 \text{cm}^3 \rightarrow 0.4102 \text{cm}^3$$

The reduction in volume per ampere-hour is, therefore, 0.31 cm$^3$.

An analogous calculation leads to results close to 0.3 cm$^3$ for lead oxides also.

Figure 2:
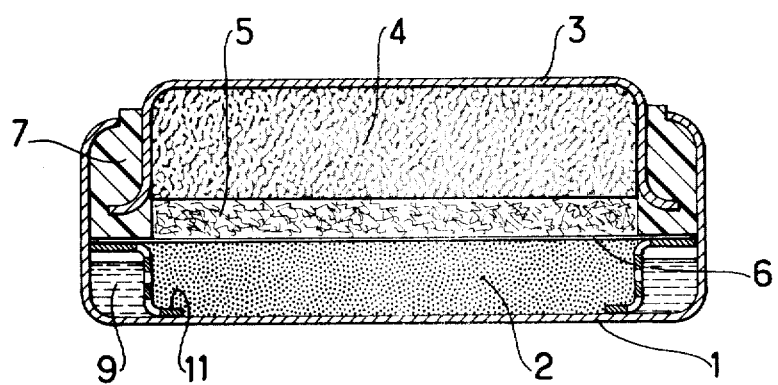
FIG. 2 shows in the same way a second embodiment of a cell in accordance with the invention.
Figure 3:
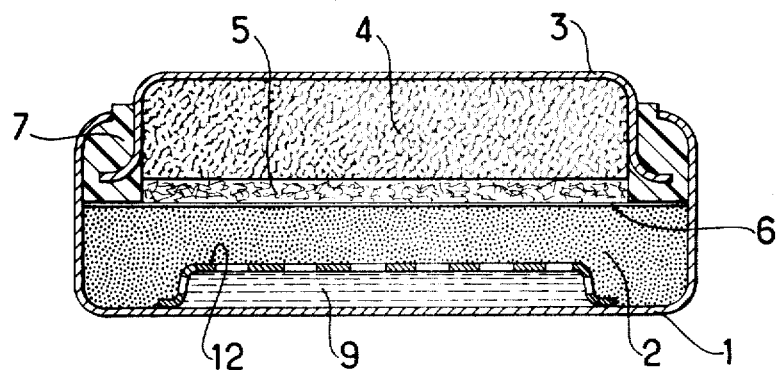
FIG 3 shows in the same way a third embodiment of a cell in accordance with the invention.

In FIGS. 2 and 3 the same reference numerals as those in FIG. 1 designate identical components.

FIG. 2 shows another form of perforated partition defining an annular compartment containing the reserve of electrolyte. The cup 8 of FIG. 1 is replaced by a ring 11 which delimits an annular space 9. In this embodiment, the positive mass is in direct contact with the bottom of the cup 1.

FIG. 3 shows a third embodiment in accordance with the invention. This time, the compartment 9 is delimited by a perforated cup 12, the edges of which are in close contact with the bottom of cup 1 and can be welded thereto. Assembly is a little more difficult than for the cells of FIGS. 1 and 2, but operation is the same.

It must be understood that other embodiments can be obtained by modifying details, such as the shape of the perforated wall delimiting the compartment 9, without thereby going beyond the scope of the invention.

What is claimed is:

1. A button type electric cell comprising a first metal cup containing a positive active mass and serving as a current collector for the positive electrode of the cell, a second metal cup fitted together with the first metal cup in facing relation thereto and containing a negative active mass and acting as a current collector for the negative electrode of the cell, a separator impregnated with electrolyte between the positive and negative active masses, and an insulating seal at the joint between the two cups fitted together, the overall volume of the active masses being different in the charged state than in the discharged state, wherein the improvement comprises a perforated metal sheet in electrical contact with the first cup and having a portion thereof spaced from the inner wall of said first cup to form at least one compartment situated between said wall and the positive active mass, said compartment being filled with electrolyte when the active materials of the cell are in that state of charge in which they take up the maximum volume.

2. A cell according to claim 1, wherein the cell is a primary cell and the active materials have their maximum overall volume in the charged state.

3. A cell according to claim 2, wherein the negative electrode is soluble.

4. A cell according to claim 3, wherein the negative active material is lithium and the positive active material is chosen from the group: cupric oxide, lead oxide (PbO), and red lead (Pb$_3$O$_4$).

5. A cell according to claim 4, the volume of electrolyte contained in said compartment is of the order of 0.3 cubic centimeters per ampere-hour of the capacity of the cell.

6. A cell according to claim 1, wherein the volume of said compartment is of the order of the net change in overall volume of the active masses between the charged and discharged states, whereby sufficient electrolyte is available from said compartment to fill voids in the cell when the active masses are in the state in which they occupy minimum volume so as to maintain a low internal resistance in the cell for all states between full charge and complete discharge.

* * * * *